United States Patent Office 3,719,630
Patented Mar. 6, 1973

3,719,630
SOLVENT-FREE LIQUID ORGANOSILOXANE RESINS
Robert C. Antonen, Midland, Mich., assignor to Dow Corning Corporation, Midland, Mich.
No Drawing. Continuation-in-part of application Ser. No. 123,472, Mar. 11, 1971, which is a continuation-in-part of application Ser. No. 11,031, Feb. 12, 1970, both now abandoned. This application Sept. 20, 1971, Ser. No. 182,232
Int. Cl. C08g 51/04
U.S. Cl. 260—37 SB                15 Claims

ABSTRACT OF THE DISCLOSURE

Liquid resins consisting essentially of 15–55 mol percent $CH_3SiO_{3/2}$ units, 2–20 mol percent $(C_6H_5)_2SiO$ units, 20–40 mol percent $C_6H_5SiO$ units, 10–40 mol percent of $CH_3(CH_2=CH)SiO$ or $CH_2=CHSiO_{3/2}$ units, 0–25 mol percent $CH_3(C_6H_5)SiO$ units and 0–25 mol percent $(CH_3)_2SiO$ units are utilized as binders for ceramic formulations.

This application is a continuation-in-part of copending application Ser. No. 123,472; filed Mar. 11, 1971, now abandoned, which in turn is a continuation-in-part of application Ser. No. 11,031; filed Feb. 12, 1970, now abandoned.

This invention relates to solvent-free liquid organosilicon resins. In one aspect the invention relates to a superior binder resin for ceramic formulations. In another aspect the invention relates to high strength ceramic materials.

Siloxane molding and coating compositions, including organosilicon resins admixed with fillers, are well known. Organosiloxanes having a degree of substitution (R/Si ratio) of from 0.9 to 1.9 are generally classed as resins. A variety of organosilicon resins have been used as binders for ceramic materials. These ceramic materials are a mixture of the binder resin and volatile-free fillers, such as alumina or silicon carbide, which when fired at high temperatures (above 500° C.), gives a strong coherent mass having dimensional stability and chemical inertness. Although not necessary, the firing of the mixture can result in a phase change of certain filler components, either by vitrification, sintering or chemical reaction.

Certain organosilicon resins, such as phenylmethylpolysiloxane having a degree of substitution of 1.15 and a phenyl to methyl ratio of 1.13/1.0 are solid materials. The use of solid granular resins as binders provides problems in mixing the components of the ceramic material. Additionally, it is difficult to fabricate the unfired material to obtain a useful article. Generally the "green" or unfired ceramic must be press molded to obtain a suitable article.

Liquid resins have been suggested for use in ceramic formulations—see U.S. Pat. 3,090,691. The use of a liquid resin as a binder in ceramic formulations is especially attractive because such formulations are easily processed and fabricated. The suggested liquid resins are unsatisfactory in certain applications because the formulations based on such resins lack green strength, require a relatively long molding cycle and firing time, and the fired parts often crack during ceramification.

The liquid organosilicon resins of the present invention function as improved binders in ceramic formulations. The ceramic materials based on these resins are easily processed and fabricated and show improved strength in both the unfired and fired state.

Thus it is an object of the invention to provide novel liquid organosilicon resins.

It is another object of the invention to provide a high strength ceramic material.

These and other objects of the invention will be apparent to one skilled in the art upon consideration of the following disclosure.

According to the invention, there is provided a solvent-free liquid organosilicon composition consisting of (a) 15 to 55 mol percent $CH_3SiO_{3/2}$ units, (b) 2 to 20 mol percent $(C_6H_5)_2SiO$ units, (c) 20 to 40 mol percent $C_6H_5SiO_{3/2}$ units, (d) 10 to 40 mol percent of units of the formula $(CH_3)(CH_2=CH)SiO$ or $CH_2=CHSiO_{3/2}$, (e) 0 to 25 mol percent $C_6H_5(CH_3)SiO$ units, and (f) 0 to 25 mol percent $(CH_3)_2SiO$ units, said composition having from 1.3 to 1.6 of the defined organic substituents per silicon atoms.

The above-described copolymeric resins are best prepared by cohydrolysis of the corresponding silanes. The cohydrolysis can be carried out by conventional techniques, such as by addition of a mixture of the chlorosilanes to an excess of water or alcohol. Resins prepared in this manner have a ≡SiOH content of from 1 to about 10 weight percent and in addition can contain alkoxy substituents bonded to silicon atoms. Care should be taken during the hydrolysis to prevent gellation. One method of avoiding gellation and extending the shelf-life of the resin is to "body" the resin by heating the resin in the presence of a condensation catalyst, such as zinc, sodium hydroxide and the like. The "bodying" promotes silanol condensation and raises the viscosity of the resin. By bodying the resin, the hydroxyl content can be reduced to essentially nil. As a means of controlling viscosity in the final resin product, it may be desirable to incorporate small amounts of triorganosiloxy units $(R_3SiO_{1/2})$ during the cohydrolysis or bodying steps. This can be accomplished by adding trialkylchlorosilane or triphenylchlorosilane in small amounts, generally not above 0.5 mole percent. These small amounts do not affect the resin characteristics obtained from the molar components described below.

The monomethylsiloxane (a), diphenylsiloxane (b) and monophenyl siloxane (c) units are necessary to the resin formulation in order to give green strength when it is used as a binder in ceramic materials. The proportion of monomethyl to diphenyl to monophenyl substituents is believed to provide a resin having an orderly decomposition of the organic groups, allowing the volatiles to escape from ceramic formulations over a wide temperature range during firing. It is hypothesized that this orderly decomposition allows the volatiles to escape at such a rate that firing of crack-free ceramic articles can be accomplished in a relatively short time.

The monovinylsiloxane or methylvinylsiloxane units (d) are present in the resin to provide the cross-linking sites necessary for curing and obtaining a solid resin. When used as a binder for ceramics, the resin is, of course, cured after processing and fabricating of the ceramic article. The resin is cured by heating with an organic peroxide whereby there is cross-linking via the vinyl groups. The amount of peroxide catalyst is not critical, but generally 0.1 to 10 weight percent, based on the weight of resin, is used. Typical of suitable organic peroxide catalysts are acetylperoxide, tertbutylperbenzoate, benzoylperoxide, tertbutylhydroperoxide, tertbutylperacetate, dicumylperoxide and p-tert-butylisopropyl-benzenehydroperoxide, tertbutylperbenzoate. Dicumyl peroxide and 2,5-dimethyl-2,5 bis(t-butylperoxy) hexane are preferred catalysts. The curing temperature and time necessary to obtain complete curing will depend on the degree of activity of the particular peroxide, the amount of catalyst present, and the amount of vinyl groups in the resin. Thus, curing conditions can vary widely with temperatures of 300° F. or greater being in general use.

The methylphenylsiloxane units (e) and dimethylsiloxane units (f) are optional components of the resin formulation. Their principal effect is to reduce the viscosity of the organosilicon resin. In those formulations having a high monomethylsiloxane and/or monophenylsiloxane content, the presence of the units, (d) or (e) or mixtures thereof, is required in order to obtain a solvent-free liquid. When used as ceramic binders, the liquid resins are high viscosity fluids of from 5,000 to 1,000,000 cs. (centistokes) or more when measured at 25° C., with viscosities in the range of 20,000 to 500,000 cs. being preferred for uses which require high flow.

The degree of substitution limitations are imposed by mol percent requirements (a maximum of 1.6 organic units/silicon atom is possible) and the requirement that the resin be a solvent-free liquid (below a degree of substitution of 1.3 the resins are solids).

A preferred embodiment of the invention is a solvent-free liquid resin consisting essentially of 15 to 25 mol percent $CH_3SiO_{3/2}$ units, 10–15 mol percent $(C_6H_5)_2SiO_2$ units, 20–30 mol percent $C_6H_5SiO_{3/2}$, 20–30 mol percent $(CH_3)(CH_2=CH)SiO$ units and 15–25 mol percent $(CH_3)_2SiO$ units. When mixed with a filler, such as alumina or silicon carbide cured and fired this resin provides ceramic material of especially high strength.

Although the resins have been described as binders for ceramic material, their use is not so limited. The resins of the invention can also be used as casting and molding resins and as electrical varnishes and protective coatings for metal surfaces. The resins of the invention can be combined with the described peroxide catalysts and solid inorganic filler material to obtain heat-curable compositions which are useful as molding compounds. Conventional solid inorganic fillers, such as silica, mica, asbestos, carbon black, talc, fused silica, glass fibers, ground quartz and the like, are suitable for use in formulating these molding compounds. The heat-curable compositions containing granular fused silica as the filler are especially suitable for encapsulating transistors and other electronic devices. Depending on the resin viscosity and flow characteristics needed in the molding operation, the molding compounds generally contain from 40 to 90 weight percent of the fillers.

While the heat-curable compositions of the invention consist essentially of the defined resins, catalysts and fillers, it is understood that the composition can contain small amounts of additives, such as mold release agents, for example calcium stearate, stabilizers, flow agents, for example, beeswax, and pigments, such as ferric oxide and the like. These curable compositions can be utilized as conventional molding compounds. In their uncured state, the compositions are of a paste or putty-like consistency and can be easily molded or extruded. Upon heating and curing the resin, a rigid article is obtained which can be employed in environments below 300° C.

Preferred for most ceramic applications are the heat-curable compoistions consisting essentially of mixture of (1) 5 to 20 percent by weight of a liquid organosilicon resin consisting essentially of (a) 15 to 55 mol percent $CH_3SiO_{3/2}$ units, (b) 2 to 20 mol percent $(C_6H_5)_2SiO$ units, (c) 20 to 40 mol percent $C_6H_5SiO_{3/2}$ units, (d) 10 to 40 mol percent of units of the formula $$(CH_3)(CH_2=CH)SiO$$

or $CH_2=CHSiO_{3/2}$, (e) 0 to 25 mol percent $$C_6H_5(CH_3)SiO$$

units, and (f) 0 to 25 mol percent $(CH_3)_2SiO$ units, said composition having from 1.3 to 1.6 of the defined organic substituents per silicon atoms and from 0.1 to 10 weight percent, based on the weight of resin, of an organic peroxide curing catalyst; and (2) from 80 to 95 percent by weight of a volatile-free refractory filler having a melting or decomposition point above 800° C.

The term "volatile-free" means that the filler is free of volatile materials, such as water (either in the form of absorbed water or in the form of hydroxyl groups) and other materials which give off volatiles upon heating, such as carbonates or organic materials. These volatile-free fillers can be prepared by calcining the materials at temperatures which give an anhydrous product and decomposed carbonates.

Generally, the refractory fillers are calcined at temperatures of 500° C. or more. Refractories are nonmetallic inorganic solids having the ability to withstand high temperatures without melting or decomposing. For purposes of this invention, that melting or decomposition temperature is defined as 800° C. or more. The refractories can be of natural origin, such as the mineral silicates, or they can be derived synthetically, such as silicon nitride.

A specific class of refractories suitable for use in the formulation of ceramic molding compositions are the carbides of boron, silicon, molybdenum, tungsten, chromium, zirconium, hafnium, thorium and titanium. Also suitable are aluminates, silicates, oxides, borides, nitrides and silicides, such as calcium aluminate, calcium aluminosilicate, magnesium silicate, aluminum silicate, zirconium silicate, ltihium aluminum silicate, beryllia, titania, alumina, silica, magnesium oxide, zinc oxide, tantalum oxide, thorium oxide, silicon nitride, boron nitride, zirconium, nitride, hafnium nitride, chromium silicide, magnesium silicide, tungsten silicide, thorium boride, titanium boride, niobium boride and the like. Graphitic and amorphous carbon can also be used. Preferred refractory fillers are magnesium silicate, aluminum silicate, silica, magnesium oxide, alumina, zinc oxide, zirconium silicate, silicon carbide, alumina, nitride and thorium oxide; silica, alumina, silicon carbide, zirconium silicate and mixtures thereof being most preferred.

The crystalline structure of the filler is not critical and the filler can be in the form of particles and/or short fibers. The particle size is not critical although finely divided powdered materials are preferred. Of course, it is within the scope of the invention to use mixtures of fillers and mixtures of particles and fibers.

In addition to the combination of the defined resin, catalyst and refractory filler which are essential to obtain a coherent ceramic-like mass upon firing, the mixture can contain adjuvants commonly used in the manufacture of ceramics. Low temperature vitrification agents, such as lead borosilicate glass frits, and fluxes, such as calcium fluoride, barium oxide, and barium sulfate are exemplary of such adjuvants. Void-forming materials, such as wood flour, which burn out upon firing can be added to obtain increased porosity. These ceramic adjuvants are added in minor amounts, generally no more than 10 or 15 weight percent being present in the total composition.

Another aspect of the present invention relates to a method of producing ceramic articles heating the above-described refractory-filled molding composition to a temperature in the range of from 500 to 2000° C. until a ceramic article is obtained.

The shaping of the uncured molding composition can be accomplished by a variety of conventional techniques. For example, transfer or injection molding can be used to produce complicated shapes. Elongated objects can be formed by extrusion of the molding composition. Composite articles can be fabricated by spreading the uncured material over a suitable substrate. To obtain optimum molding properties in ceramic formulations, it is preferred that the composition contain from 10 to 15 percent by weight of the resin.

In some instances, the uncured material will slump during the initial phase of firing. To avoid this, the organosilicon component is partially or completely cured prior to firing. The degree of curing is dependent on the shape of the article. For example, parts having an intricate shape in which close tolerances must be maintained are fully cured before firing. The curing temperature is generally above 150° C. and the duration of the curing step is dependent on the degree of cure desired, the amount and nature of the catalyst and the amount of vinyl substituents in the resin. In any event, the formed article is cured to a degree sufficient to give the necessary strength to avoid loss of shape during firing.

It is necessary for the production of a ceramic article that the at least partially cured molding composition be heated at a temperature of 500° C. or above. It is believed that the 500° C. temperature is necessary to provide an effective decomposition rate of the organosilicon resin. The heating of the molding compound is generally continued until no further weight loss is observed. This duration of heating will vary depending on the temperature, the specific resin formulation and amount of resin in the molding compound. Weight loss usually ceases after from 2 to 24 hours at from 500 to 2000° C.

Although not required in the practice of the method of the invention, firing the composition may cause a phase change as a result of vitrification or partial melting of certain types of fillers. A phase change can also result from sintering, in which, under the influence of high temperature, some of the crystals of the filler particles will grow at the expense of others to fill voids in the material. A third type of phase change can result from the chemical reaction of two or more components of the mixture. This causes at least the partial disappearance of one component and the formation of a separate phase. An example of such a phase change is the reaction of silica with alumina to form mullite when the article is fired at above 1590° C. In some cases the phase change results in undesirable shrinkage. In such cases, the phase change can be minimized by selection of the proper combination of fillers and firing temperature.

The fired ceramic article obtained by this method is a non-metallic, inorganic, water-insoluble coherent mass having a softening or decomposition point of above 800° C. The articles are of exceptionally high strength, often showing flexural strengths in excess of 20,000 p.s.i.

The following examples are illustrative of the invention which is delineated in the claims.

EXAMPLE 1

A mixture of 134.6 grams of $CH_3SiCl_3$, 116.1 grams of $(CH_3)_2SiCl_2$, 285.5 grams of $C_6H_5SiCl_3$, 151.8 grams of $(C_6H_5)_2SiCl_2$ and 176 grams of $CH_3(CH_2=CH)SiCl_2$ was dissolved in 792 grams of toluene. This mixture was added slowly beneath the surface to a solution of 1790 grams of water and 366 grams of isopropanol to effect hydrolysis of the chlorosilanes. The resulting resin solution was washed until neutral, azeotroped dry, and bodied with 0.1% zinc for 3 hours. The product was stripped at 125° C./25 mm. Hg. The solvent-free resin contained about 1% $\equiv SiOH$ and was a liquid of about 14,000 cs. viscosity.

The hydrolysis reaction is essentially quantitative, giving a resin consisting of 18 mol percent $CH_3SiO_{3/2}$ units, 18 mol percent $(CH_3)_2SiO$ units, 27 mol percent $C_6H_5SiO_{3/2}$ units, 12 mol percent $(C_6H_5)_2SiO$ units and 25 mol percent $CH_3(CH_2=CH)SiO$ units.

EXAMPLE 2

A solvent-free liquid resin (No. 1) consisting of 40 mol percent $CH_3SiO_{3/2}$ units, 10 mol percent $(C_6H_5)_2SiO$, 20 mol percent $C_6H_5SiO_{3/2}$ units, 25 mol percent $CH_3(CH_2=CH)SiO$ units and 5 mol percent $C_6H_5(CH_3)SiO$ units was prepared by hydrolysis of a mixture of the corresponding molar weight of

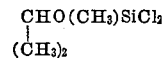

$(C_6H_5)_2SiCl_2$, $C_6H_5SiCl_3$, $CH_3(CH_2=CH)SiCl_2$ and $C_6H_5(CH_3)SiCl_2$ in sufficient water to provide a final concentration of 15% HCl in the aqueous phase. The hydrolysis product was stripped to remove water and acid. This resin contained about 4-5 $\equiv SiOH$.

A similar resin (No. 2) was prepared in the same manner and consisted essentially of 45 mol percent of $CH_3SiO_{3/2}$ units, 10 mol percent $(C_6H_5)_2SiO$ units, 20 mol percent $C_6H_5SiO_{3/2}$ units and 25 mol percent $CH_3(CH_2=CH)SiO$ units.

EXAMPLE 3

A molding compound (No. 1) consisting of 12 weight percent of the resin of Example 1 containing 3 weight percent, based on the weight of resin, of 2,5-dimethyl-2,5-bis(t-butylperoxy) hexane (50 percent active on an inert filler); 87 weight percent of alumina (−325 mesh) and 1 weight percent of calcium stearate (release agent) was prepared by mixing the components on a two-roll mill at room temperature. The resulting compound had the consistency of firm putty. Bar specimens (5" x ½" x ¼") of the compound were prepared by transfer molding using a ten ton press. High flow and good moldability were observed during the transfer molding.

Several other molding compounds were prepared by the above method and are described below. In all of the compounds the above-described alumina was used as the volatile-free anhydrous filler and calcium stearate was used as the the release agent. In these compounds, catalyst "A" designates 2,5-dimethyl-2,5-bis(t-butylperoxy) hexane and catalyst "B" designates dicumyl peroxide. The weight percent of catalyst is based on the weight of resin. All other weight percents are based on the total weight of compound.

Molding compound No. 2 consisted of 12 weight percent of the resin of Example 1, containing 3 weight percent of catalyst "B"; 87 weight percent filler and 1 weight percent release agent. This compound had the consistency of firm putty and exhibited good moldability.

Molding compound No. 3 consisting of 12 weight percent of resin No. 1 of Example 2 containing 2.4 weight percent catalyst "A"; 87 weight percent filler and 1 weight percent release agent. It also had the consistency of firm putty and was fairly easy to mold.

Molding compound No. 4 consisted of 12 weight percent of resin No. 2 of Example 2 containing 2.4 weight percent of catalyst "A"; 87 weight percent filler and 1 weight percent release agent and exhibited high flow and fair moldabilty during transfer molding.

To show the necessity of including diphenylsiloxy units in the binder resin, an organosilicon compound consisting of 45 mol percent $CH_3SiO_{3/2}$ units, 40 mol percent $C_6H_5SiO_{3/2}$ units and 15 mol percent $CH_3(CH_2=CH)SiO$ units was prepared. Molding compound (No. 5) based on 12 weight percent of this resin containing 2.4 weight percent of catalyst "A"; 87 weight percent filler and 1 weight percent release agent exhibited fair moldability.

As a comparison with prior art liquid resins, a copolymer consisting of 50 mol percent $C_6H_5(CH_2=CH)SiO$ units and 50 mol percent $C_6H_5(CH_3)SiO$ units was prepared. Molding composition (No. 6), consisting of 12 weight percent of this resin, containing 3 weight percent of catalyst "A"; 87 weight percent filler and 1 weight percent release agent, exhibited poor moldability and required a relatively long molding cycle to obtain a degree of cure which would allow removal of the specimen from the mold.

A second resin was prepared as a comparison with the prior art. The liquid resin consisted of 60 mol percent $C_6H_5(CH_3)SiO$ units, 35 mol percent $$C_6H_5(CH_2=CH)SiO$$

units and 5 mol percent $(C_6H_5(CH_3)(CH_2=CH)SiO_{1/2}$ units. Molding composition No. 7 consisted of 12 weight percent of this resin, containing 3 weight percent of catalyst "A"; 87 weight percent of filler and 1 weight percent release agent and exhibited poor moldability, the test specimens warping when removed from the mold. Molding composition No. 8 was similar to composition No. 7 except that catalyst B was used.

Several bar specimens were molded from each of these compositions. The bars were molded at 350° F. in a ten ton press. The molding time varied with the different compositions, it being necessary to obtain a degree of curing during molding which would permit removal of the bars from the mold. After molding, and partial curing, the bars were post-cured at 200° C. for 2–4 hours. Observations of the "as molded" bars were made as to cure warpage, surface blemishes and consolidation. Flex strengths were determined for "as molded" bars and after curing.

Bar specimens of each molding composition were fired according to each of the following schedules:

Schedule No. 1—presintering, 87 hours to 950° F. (22 hours to 700° F./64 hours to 950° F./hold at 950° F. for 1 hour)

Schedule No. 2—same as schedule No. 1, cool to room temperature plus 32 hours to 2750° F. (6 hours to 650° F./12 hours to 1000° F./18 hours to 2750° F./hold at 2750° F. for 1 hour)

Schedule No. 3—fast firing, 32 hours to 2750° F. (6 hours to 650° F./12 hours to 1000° F./18 hours to 2750° F./hold at 2750° F. for 1 hour)

As a further comparison, certain of the molding compounds were fired on schedule No. 4—a fast firing of 21 hours to 1800° F. (122° F./hour for 14 hours/hold at 1800° F. for 7 hours).

The flex strength of all bar specimens were determined. All flex strengths were determined at room temperature and the values reported below represent the average of three such determinations.

EXAMPLE 4

When 33 grams of the resin of Example 1, 66 grams of particulate fused silica, 0.5 gram of carbon black (pigment), 0.25 gram of zinc stearate (mold release agent) and 0.33 gram of dicumyl peroxide are blended at room temperature on a two-roll mill, there is obtained a putty-type molding composition. This composition can be used to encapsulate transistors by means of transfer molding, the cured article being removed from the mold after 5 minutes at 350° F. to provide a device which has high tolerance to humidity and thermal shock.

EXAMPLE 5

A mixture of 285 lbs. of $CH_3SiCl_3$, 222 lbs. of $(CH_3)_2SiCl_2$, 546 lbs. of $C_6H_5SiCl_3$, 291 lbs. of $(C_6H_5)_2SiCl_2$ and 337 lbs. of $CH(CH_2=CH)SiCl_2$ in 1510 lbs. of toluene were added to a mixture of 3630 lbs. of water and 622 lbs. of isopropanol. The water-isopropanol solution was contained in a 750 gallon glass-lined reactor and the chlorosilane-toluene was added while agitating the reactor contents. Agitation was continued for 65 minutes after completion of the addition. After termination of agitation and separation of the resin-toluene and water-HCl-isopropanol layers, the latter was drained from the reactor. Another 3630 lbs. of water was added to the resin, agitated for two minutes, allowed to separate and drained from the reactor. The reactor was then heated and the remaining water was distilled from the resin over a 3½-hour period.

The resin was bodied by adding 80 grams of sodium hydroxide (as 50% aqueous solution) and 290 grams of hexamethyldisiloxane (as endblocker to control viscosity) to the washed resin. The mixture was agitated at reflux temperature (106° C.) for six hours. After cooling to 70° C., 239 grams of $(CH_3)_3SiCl$ (neutralizer) was added with agitation. The bodied resin solution was then stripped of toluene by heating under vacuum. The bodied solvent-free resin was of the same molar composition as that of Example 1, but contained only 0.1 weight percent≡SiOH and had a viscosity of about 750,000 cs. as determined at 25° C. Although the resin theoretically contained 0.13 mole percent $(CH_3)_3SiO$— units, repeated analysis of the resin failed to detect any trimethyl functionality.

This example demonstrates in detail the production of low-hydroxyl content, high viscosity resins of the invention. This resin can be combined with fillers, such as

PHYSICAL PROPERTIES

| Molding compound No. | Mold cycle (min.) | As molded at 350° F. | | Post cure at 200° C. | | Firing No. | | | |
|---|---|---|---|---|---|---|---|---|---|
| | | Flex (p.s.i.) | Sample condition | Hrs. | Flex (p.s.i.) | 1 | 2 | 3 | 4 |
| 1 | 3 | 4,120 | Coherent | 2 | 4,050 | 3,190 | 14,075 | 9,250 | 3,970 |
| 2 | 3 | 4,120 | do | 2 | 4,840 | 2,350 | 14,480 | 9,180 | 3,745 |
| 3 | | | do | 4 | 4,980 | 5,400 | 22,500 | 13,800 | |
| 4 | | | do | 4 | 5,360 | 4,500 | 18,120 | 26,850 | |
| 5 | | | do | 4 | 4,690 | 1,995 | 6,340 | | |
| 6 | 30 | 850 | Poor consolidation, small pores, excess resin bleed. | 2 | 1,200 | 1,070 | 9,150 | 8,620 | 2,175 |
| 7 | 10 | 1,300 | Soft, voids, warped | 2 | 1,885 | 2,410 | 9,480 | 10,950 | 3,140 |
| 8 | 10 | 1,690 | Soft, voids | 2 | 2,485 | 1,625 | 9,770 | 10,920 | 2,230 |

A comparison of the data presented for the compounds within the scope of the invention (Nos. 1–4) with the data presented for prior art materials (Nos. 5–8) shows the superiority of the resins of the invention as binders in ceramic formulations. The relatively short molding cycle is of importance in the production of large numbers of parts, as is the high "as molded" strength. Excessive resin bleed, such as noted in the molding of Compound No. 6, is eliminated, thus preventing buildup of deposits in the mold. The high strengths of the ceramified material are necessary in many applications, such as when used in turbines engines.

alumina, fused glass, or glass-ceramics, to form a molding composition which has the consistency of very stiff putty.

That which is claimed is:

1. A solvent-free liquid organosilicon composition consisting essentially of:

(a) 15 to 55 mol percent $CH_3SiO_{3/2}$ units,
   (b) to 20 mol percent $(C_6H_5)_2SiO$ units,
   (c) 20 to 40 mol percent $C_6H_5SiO_{3/2}$ units,
   (d) 10 to 40 mol percent of units of the formula $$(CH_3)(CH_2=CH)SiO \text{ or } CH_2=CHSiO_{3/2},$$

(e) 0 to 25 mol percent $C_6H_5(CH_3)SiO$ units, and (f) 0 to 25 mol percent $(CH_3)_2SiO$ units,
said composition having from 1.3 to 1.6 of the defined organic substituents per silicon atoms.

2. The composition of claim 1 including from 0.1 to 10 percent by weight, based on the weight of organosilicon composition, of an organic peroxide curing catalyst for said composition.

3. The composition of claim 2 wherein the catalyst is dicumyl peroxide.

4. The composition of claim 2 wherein the catalyst is 2,5-dimethyl-2,5 bis(t-butylperoxy) hexane.

5. The cured composition of claim 2.

6. The composition of claim consisting essentially of
   (a) 15 to 25 mol percent $CH_3SiO_{3/2}$ units;
   (b) 10 to 15 mol percent $(C_6H_5)_2SiO$ units;
   (c) 20 to 30 mol percent $C_6H_5SiO_{3/2}$ units;
   (d) 20 to 30 mol percent $(CH_3)(CH_2=CH)SiO$ units; and
   (e) 15 to 25 mol percent $(CH_3)_2SiO$ units.

7. The composition of claim 6 including from 0.1 to 10 percent by weight, based on the weight of the organosilicon resin, of an organic peroxide curing catalyst for said composition 8. The composition of claim 7 wherein the catalyst is selected from the group consisting of dicumyl peroxide and 2,5-dimethyl-2,5 bis(t-butylperoxy) hexane.

9. A heat-curable composition consisting essentially of
   (a) the organosilicon composition of claim 2; and
   (b) a solid inorganic filler.

10. The heat-curable composition of claim 9 wherein the solid inorganic filler is particulate fused silica.

11. A heat-curable composition consisting essentially of
    (a) 5 to 20 percent by weight of the organosilicon composition of claim 2; and
    (b) 80 to 95 percent by weight of a volatile-free refractory filler having a melting or decomposition point above 800° C.

12. A heat-curable composition in accordance with claim 11 containing from 10 to 15 weight percent of the organosilicon composition.

13. A heat-curable composition consisting essentially of
    (a) 5 to 20 percent by weight of the organosilicon composition of claim 2,
    (b) 80 to 95 percent by weight of a volatile-free refractory filler selected from the group consisting of magnesium silicate, aluminum silicate, magnesium oxide, alumina, zinc oxide, zirconium silicate, silicon carbide, silicon nitride, and thorium oxide.

14. A heat curable composition in accordance with claim 13 wherein the volatile free refractory filler (b) is selected from the group consisting of alumina, silicon carbide, silica, zirconium silicate and mixtures thereof.

15. A heat-curable composition consisting essentially of
    (a) 5 to 20 percent by weight of the organosilicon composition of claim 7; and
    (b) 80 to 95 percent by weight of a volatile free refractory filler selected from the group consisting of magnesium silicate, aluminum silicate, silica, magnesium oxide, alumina, zinc oxide, zirconium silicate, silicon carbide, silicon nitride, and thorium oxide.

References Cited
UNITED STATES PATENTS 3,629,297  12/1971  Antonen _____ 260—46.5 UA X LEWIS T. JACOBS, Primary Examiner

U.S. PATENT OFFICE
UNITED STATES PATENT OFFICE
CERTIFICATE OF CORRECTION

Patent No. 3,719,630　　　　　　　　　　Dated:　March 6, 1973

Robert C. Antonen

It is certified that errors appear in the above-identified patent and that said Letters Patent are hereby corrected as shown below:

Column 8, line 70, after "(b)" and before "to" insert --2--.

Column 9, in claim 6, line 13, after "claim" and before "consisting" insert --1--.

Signed and sealed this 27th day of November 1973.

(SEAL)
Attest:

EDWARD M. FLETCHER, JR.　　　　　RENE D. TEGTMEYER
Attesting Officer　　　　　　　　　Acting Commissioner of Patents